United States Patent
Jeong

(10) Patent No.: US 8,902,309 B2
(45) Date of Patent: Dec. 2, 2014

(54) APPARATUS OF ACQUIRING 3D INFORMATION, METHOD FOR DRIVING LIGHT SOURCE THEREOF, AND SYSTEM FOR ACQUIRING 3D INFORMATION

(75) Inventor: Taek-Seong Jeong, Suwon-Si (KR)

(73) Assignee: Samsung Electronics Co., Ltd (KR)

( * ) Notice: Subject to any disclaimer, the term of this patent is extended or adjusted under 35 U.S.C. 154(b) by 502 days.

(21) Appl. No.: 12/984,208

(22) Filed: Jan. 4, 2011

(65) Prior Publication Data

US 2011/0164119 A1   Jul. 7, 2011

(30) Foreign Application Priority Data

Jan. 5, 2010  (KR) .................. 10-2010-0000447

(51) Int. Cl.
*H04N 5/00* (2011.01)
*H04N 13/02* (2006.01)

(52) U.S. Cl.
CPC ....... *H04N 13/0253* (2013.01); *H04N 13/0207* (2013.01)
USPC ............................................ 348/135; 348/51

(58) Field of Classification Search
CPC ................................ H04N 5/74; H04N 13/02
USPC ............... 353/119; 382/108, 154; 348/46, 51, 348/135; 345/589; 375/240.01; 600/425
See application file for complete search history.

(56) References Cited

U.S. PATENT DOCUMENTS

| | | | |
|---|---|---|---|
| 6,542,249 B1 * | 4/2003 | Kofman et al. | 356/601 |
| 6,709,116 B1 * | 3/2004 | Raskar et al. | 353/121 |
| 7,844,079 B2 * | 11/2010 | Hassebrook et al. | 382/108 |
| 2005/0207486 A1 * | 9/2005 | Lee et al. | 375/240.01 |
| 2007/0268211 A1 * | 11/2007 | Whitehead et al. | 345/55 |
| 2007/0273848 A1 * | 11/2007 | Fan et al. | 353/119 |
| 2008/0317332 A1 * | 12/2008 | Ivanov et al. | 382/154 |
| 2009/0046301 A1 | 2/2009 | Asakura et al. | |
| 2009/0073275 A1 * | 3/2009 | Awazu | 348/222.1 |
| 2009/0240138 A1 * | 9/2009 | Yi | 600/425 |
| 2010/0079581 A1 * | 4/2010 | Russell et al. | 348/46 |
| 2010/0207954 A1 * | 8/2010 | Kim | 345/589 |

FOREIGN PATENT DOCUMENTS

| | | |
|---|---|---|
| CN | 1140834 | 1/1997 |
| CN | 1482491 | 3/2004 |
| JP | 2006-047464 | 2/2006 |
| JP | 2006047464 A * | 2/2006 |
| WO | WO 2007/102667 | 9/2007 |

* cited by examiner

*Primary Examiner* — Sath V Perungavoor
*Assistant Examiner* — Jeffery Williams
(74) *Attorney, Agent, or Firm* — The Farrell Law Firm, P.C.

(57) ABSTRACT

An apparatus for acquiring 3-dimensional (3D) information, a method for driving a light source thereof, and a system for acquiring 3D information are provided. The apparatus includes: a projector, a photographing unit, and a controller which causes a driving signal to be applied to the projector. The driving signal has a first peak current in a display mode and a second peak current, higher than the first peak current, in a 3D mode.

21 Claims, 10 Drawing Sheets

APPARATUS OF ACQUIRING 3D INFORMATION, METHOD FOR DRIVING LIGHT SOURCE THEREOF, AND SYSTEM FOR ACQUIRING 3D INFORMATION

CROSS-REFERENCE TO RELATED APPLICATIONS

This application claims priority from Korean Patent Application No. 10-2010-0000447, filed on Jan. 5, 2010, in the Korean Intellectual Property Office, the disclosure of which is incorporated herein by reference in its entirety.

BACKGROUND OF THE INVENTION

1. Field of the Invention

The present invention relates to an apparatus for acquiring 3-dimensional (3D) information, a method for driving a light source thereof, and a system for acquiring 3D information, and more particularly, to an apparatus for acquiring 3D information using a structured-light method, a method for driving a light source thereof, and a system for acquiring 3D information.

2. Description of the Related Art 3-dimensional (3D) image technology is applied in various fields such as information communication, broadcasting, medical care, education and training, the military, games, animations, virtual reality, computer-aided design (CAD), industrial technology, etc. 3D image technology is regarded as core technology of next-generation 3D multimedia information communication which is commonly required in these various fields.

In general, a 3D effect perceived by a human is generated by compound actions of a thickness change degree of a lens caused by changes in a position of an object which is to be observed, an angle difference between both eyes and the object, differences in a position and a shape of the object seen by left and right eyes, a disparity caused by a motion of the object, and other various psychological and memory effects, etc.

Among the above-described factors, a binocular disparity occurring due to a horizontal distance from about 6 cm to about 7 cm between left and right eyes of a human is regarded as the most important factor of the 3D effect. In other words, the human sees an object with angle differences due to a binocular disparity, and images entering the left and right eyes are actually different due to the angle differences. When the two different images are transmitted to the brain of the human, the brain accurately unites information of the two different images so that the human feels an original 3D image.

In order to generate such a 3D image, a stereovision method using several cameras, a method of scanning a laser light source on a surface of an object, a structured-light method of radiating a structured image onto an object and capturing the object to acquire 3D information, or the like is used. In particular, according to the structured-light method, structured-light having a light amount enough to cope with brightness of ambient light is required to be radiated onto an object.

SUMMARY OF THE DISCLOSURE

According to an aspect of the present disclosure, an apparatus for acquiring 3-dimensional (3D) information may include a projector, a photographing unit, and a controller. The projector may be configured to project light. The photographing unit may be configured to capture an image of an object onto which the light has been projected. The controller may be configured to cause a driving signal having a first peak current to be applied to the projector in a display mode and to cause a driving signal having a second peak current, higher than the first peak current, to be applied to the projector in a 3D mode.

According to another aspect of the present disclosure, a method for driving a light source of an apparatus for acquiring 3D information may determine whether the apparatus is to operate in a display mode or a 3D mode. If it is determined that the apparatus is to operate in the display mode, applying a driving signal having a first peak current to the light source. If it is determined that the apparatus is to operate in the 3D mode, applying a driving signal having a second peak current higher than the first peak current to the light source. Light, based on the driving signal is projected.

According to yet another aspect of the present disclosure, a system for acquiring 3D information may include a projecting apparatus and a photographing unit. The projecting apparatus may include a light source and may be configured to project light. The photographing apparatus may be configured to capture an image of an object onto which the light has been projected. The projecting apparatus may apply a driving signal having a first peak current to the light source in a display mode and apply a driving signal having a second peak current, higher than the first peak current, to the light source in a 3D mode.

BRIEF DESCRIPTION OF THE DRAWINGS

Various features, aspects and benefits of the embodiments of the invention will become apparent and more readily appreciated from the following description of the embodiments, taken in conjunction with the accompanying drawings, of which.

DETAILED DESCRIPTION OF EXEMPLARY EMBODIMENTS

Figure 1:
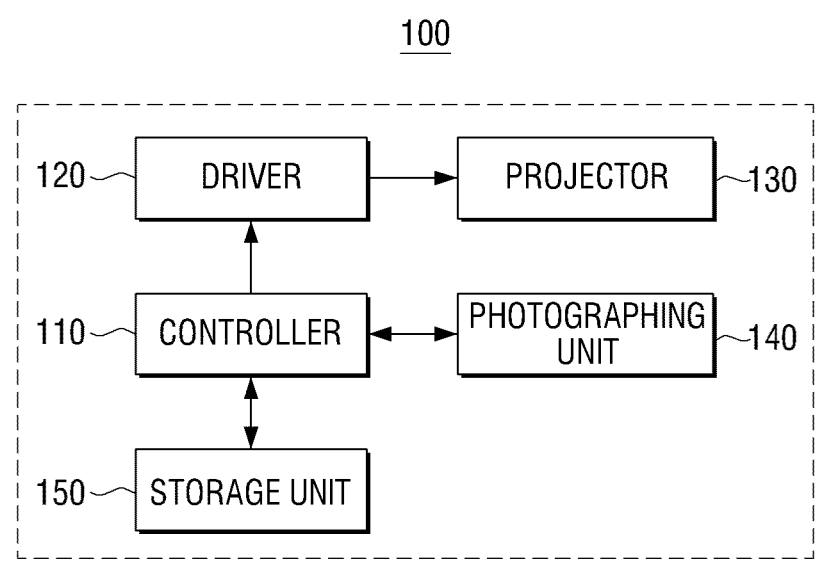
FIG. 1 is a block diagram illustrating an apparatus for acquiring 3-dimensional (3D) information according to an embodiment of the present invention.

Certain embodiments of the present invention will now be described in greater detail with reference to the accompanying drawings.

In the following description, same drawing reference numerals are used for the same elements even in different drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

In particular, a structure of an apparatus for acquiring 3-dimensional (3D) information and a method for acquiring 3D information will be described with reference to FIGS. 1 through 4, and a method for controlling a light amount will be described with reference to FIG. 5. Also, an operation flow for acquiring 3D information will be described with reference to FIG. 6, and a structure of a system for acquiring 3D information will be described with reference to FIG. 7.

1. Structure of Apparatus for Acquiring 3D Information and Method for Acquiring 3D Information FIG. 1 is a block diagram illustrating an apparatus 100 for acquiring 3D information according to an embodiment of the present invention. Referring to FIG. 1, the apparatus 100 may be a mobile device and acquires 3D information of an object using a structured-light method.

The structured-light method refers to a method of consecutively radiating coded patterned light (structured light) onto an object and capturing an image of the object onto which the patterned light has been radiated to acquire 3D depth information of the object from the captured image. In other words, if the structured light method is used, a unit for consecutively radiating patterned light and a unit for capturing an image of an object are required.

The apparatus 100 according to the present embodiment includes a controller 110, a driver 120, a projector 130, a photographing unit 140, and a storage unit 150.

The controller 110 controls an overall operation of the apparatus 100. In particular, the controller 110 operates the apparatus 100 based on a mode of the apparatus 100.

The mode of the apparatus 100 is classified into a display mode and a 3D mode for acquiring 3D information.

The display mode refers to a mode in which light is generated according to a pattern controlled by a user and the light is radiated if the apparatus 100 operates as a general device.

Since the apparatus 100 according to the present embodiment may be a mobile device, the apparatus 100 has a lower light output than if the apparatus 100 is not a mobile device or is a mobile device which is manufactured only to acquire 3D information.

The 3D mode refers to a mode in which light having different patterns is generated and radiated onto an object to acquire 3D information. A light bright enough to overcome the brightness of ambient light is required to be provided in order to acquire 3D information. For example, if luminance of the surrounding environment is 100 lux, a light amount having a brightness of about 20 lux or more enables acquisition of 3D information.

However, as described above, since the apparatus 100 according to the present embodiment may be a mobile device, the apparatus 100 may have a lower light output than if the apparatus 100 is not a mobile device or is a mobile device which is manufactured only to acquire 3D information. In order to solve this problem, in the apparatus 100, the duty rate of a light source in the 3D mode may be lower than the duty rate in the display mode to increase an instantaneous peak current of the light source in order to generate a high light output.

In order to increase the instantaneous peak current of the light source, a light-emitting diode (LED) or a laser diode (LD) may be used as the light source. If the duty rate of the light source is intentionally lowered as described above, the generated light may appear to flicker. However, since the purpose of the 3D mode is to acquire 3D information of an object, the flickering of the light does not affect the 3D mode. If the light amount is reduced in the 3D mode as compared to the display mode by lowering the duty rate of the light source in the 3D mode as compared to the display mode, the reduction in the light amount can be compensated by opening a shutter of the photographing unit 140, which will be described later, for a long time to increase an exposure time.

The controller 110 may transmit a control signal to the driver 120 to indicate either the display mode or the 3D mode.

The driver 120 may drive the projector 130 based on the control signal received from the controller 110. In particular, if a control signal corresponding to the display mode is received, the driver 120 may generate a driving signal for the display mode and transmits the driving signal to the projector 130. If a control signal corresponding to the 3D mode is received, the driver 120 may generate a driving signal for the 3D mode and transmits the driving signal to the projector 130.

The projector 130 includes the light source such the LED, the LD, or the like, generates light according to the driving signal received from the driver 120, and radiates light having any desired (or no) pattern in the display mode, but radiates patterned light, into which the light has been modulated, onto the object in the 3D mode.

The patterned light radiated onto an object will now be described with reference to FIGS. 2A through 2D. FIGS. 2A through 2D are views illustrating patterned light.

As shown in FIGS. 2A through 2D, the patterned light may include light in a plurality of patterns.

Figure 2A:
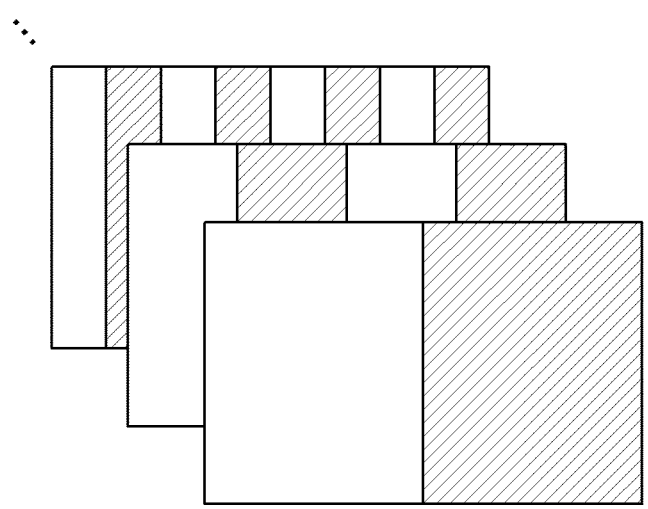
FIGS. 2A through 2D are views illustrating patterned light.

Referring to FIG. 2A, the patterned light may include a plurality of different patterns. In particular, the patterned light may be formed such that darker portions and brighter portions are alternately arranged in each of the plurality of patterned lights, and the number and an arrangement of the brighter portions and the darker portions in each of the plurality of patterned lights are different from each other.

Figure 2B:
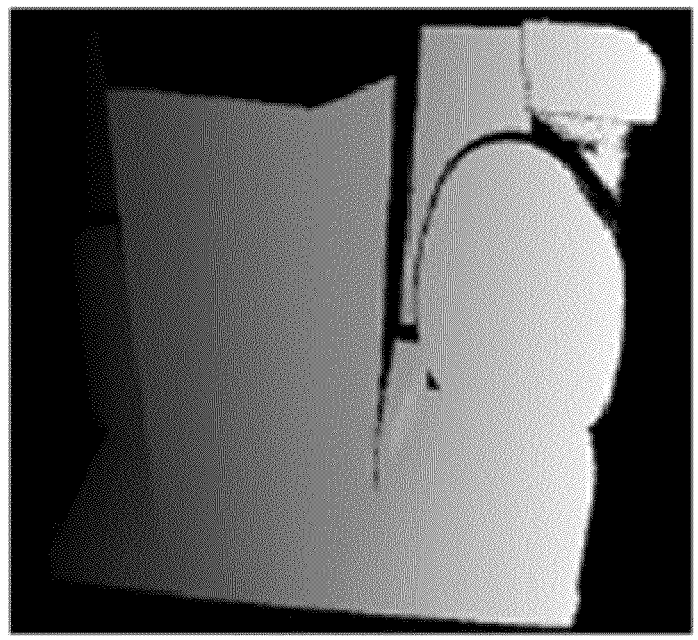

Referring to FIG. 2B, the patterned light may have an intensity distribution which varies.

Figure 2C:
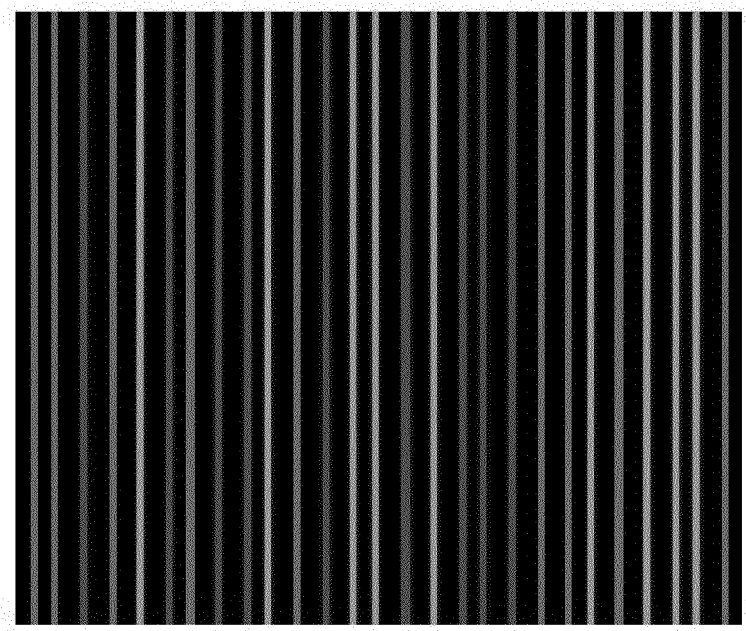
Figure 2D:
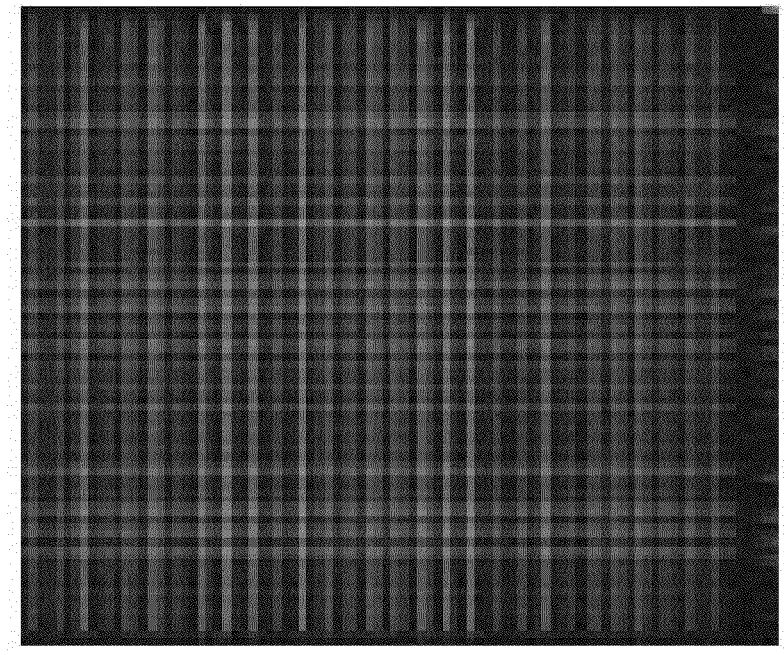

Referring to FIGS. 2C, and 2D, the patterned light may be formed in different patterns having different types of color information (RGB information).

Referring to FIG. 1 again, the projector 130 may sequentially radiate the patterned light as described with reference to FIGS. 2A through 2D onto the object at preset time intervals.

When the patterned light is sequentially radiated onto the object by the projector 130, the photographing unit 140 may capture images of the object to generate captured images based on the control signal of the controller 110.

This will now be described with reference to FIGS. 3 and 4.

Figure 3:
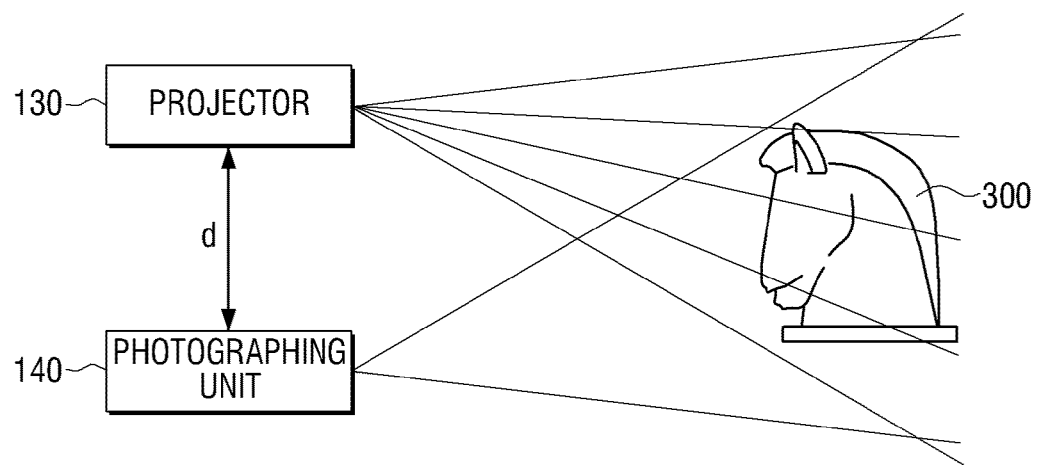
FIG. 3 is a view illustrating a process of radiating patterned light onto an object by a projector and capturing the object by a photographing unit.

FIG. 3 is a view illustrating a process of radiating patterned light onto an object 300 by the projector 130 and capturing an image of the object 300 by the photographing unit 140. As shown in FIG. 3, the projector 130 and the photographing unit 140 are separated by a distance "d" which is preset, and the projector 130 radiates the patterned light onto the object 300 at the distance "d" from the photographing unit 140. The photographing unit 140 captures an image of the object 300 onto which the patterned light has been projected in order to arithmetically calculate distances from the photographing unit 140 to respective parts of the object 300.

Figure 4:
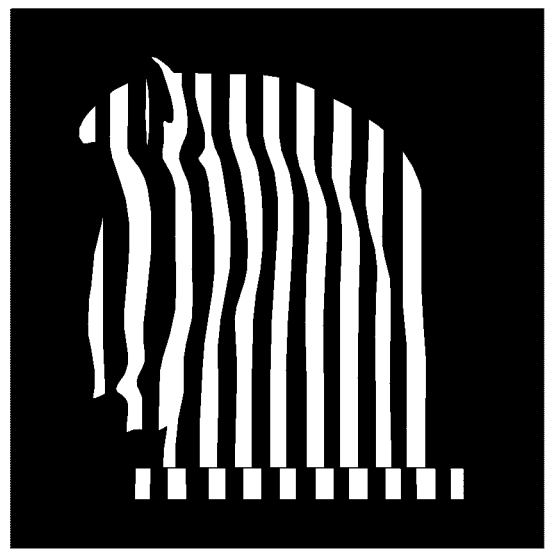
FIG. 4 is a view illustrating an image of an object which is captured by a photographing unit.

FIG. 4 is a view illustrating an image of the object 300 which is captured by the photographing unit 140. In particular, FIG. 4 is a view illustrating a captured image of the object 300 onto which the patterned light of FIG. 2A has been projected. As shown in FIG. 4, the image of the object 300 illuminated by the patterned light is captured at a distance from the photographing unit 140, and thus the patterned light displayed on the captured image has a different form from an original form of the patterned light radiated by the projector 130. Based on this, depth information, which is 3D information of the object 300, i.e., distances from the photographing unit 140 to respective parts of the object 300, is calculated.

Referring to FIG. 1 again, the photographing unit 140 may capture the images of the object illuminated by the series of patterned lights and transmit the captured images to the controller 110. The controller 110 may analyze the images to extract the 3D information of the object 300 from the images as described above. The controller 110 may add metadata to each image relating to the pattern of light applied to the object.

The storage unit 150 may store all programs for operating the apparatus 100 and the images captured by the photographing unit 140 and may be realized as a hard disk drive (HDD), a memory, or the like.

2. Method for Controlling Light Amount

Figure 5:
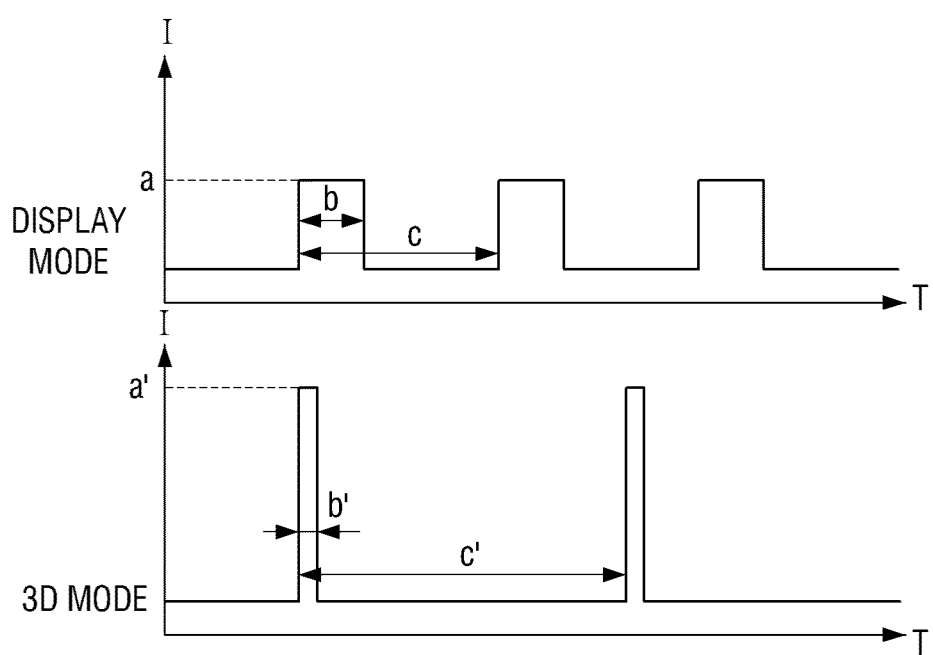
FIG. 5 is a view illustrating a method of controlling a light amount according to an embodiment of the present invention.

FIG. 5 is a view illustrating a method for controlling a light amount according to an embodiment of the present invention. A driving current used in a display mode and a driving current used in a 3D mode are shown together in FIG. 5 for convenience.

As described above, in the case of the display mode, the driving current has a peak value "a," and a duty rate of b/c. Since the peak value "a" and the duty rate "b/c" of the driving current are used in the display mode, the peak value "a" and the duty rate "b/c" may be optimized to prevent light from the light source from appearing to flicker.

In the case of the 3D mode, the driving current has a peak value "a'" higher than the peak value "a" of the driving current in the display mode, and a duty rate of "b'/c'." The duty rate "b'/c'" of the driving current in the 3D mode may be lower than the duty rate "b/c" of the driving current in the display mode. The peak value "a'" may increase with the reduction in the duty rate "b'/c'."

Thus, in the case of the display mode, the apparatus 100 may drive the light source so that the light source has the peak value "a" and the duty rate "b/c." If the display mode is changed to the 3D mode, the apparatus 100 may reduce the duty rate "b/c" of the driving current to the duty rate "b'/c'" and increases the peak value "a" to the peak value "a'." Also, if a light amount is reduced with the reduction in a duty rate as described above, the apparatus 100 may open the shutter of the photographing unit 140 for a longer time to increase an exposure time so as to secure a light amount enough to acquire 3D information.

The peak value "a'" in the 3D mode may be 5 times or less higher than the peak value "a" in the display mode. If this method is used, a depth of an object occupying an upper half or more of the body of a person may be extracted although the apparatus 100 may be a mobile device.

3. Operation Flow for Acquiring 3D Information

Figure 6:
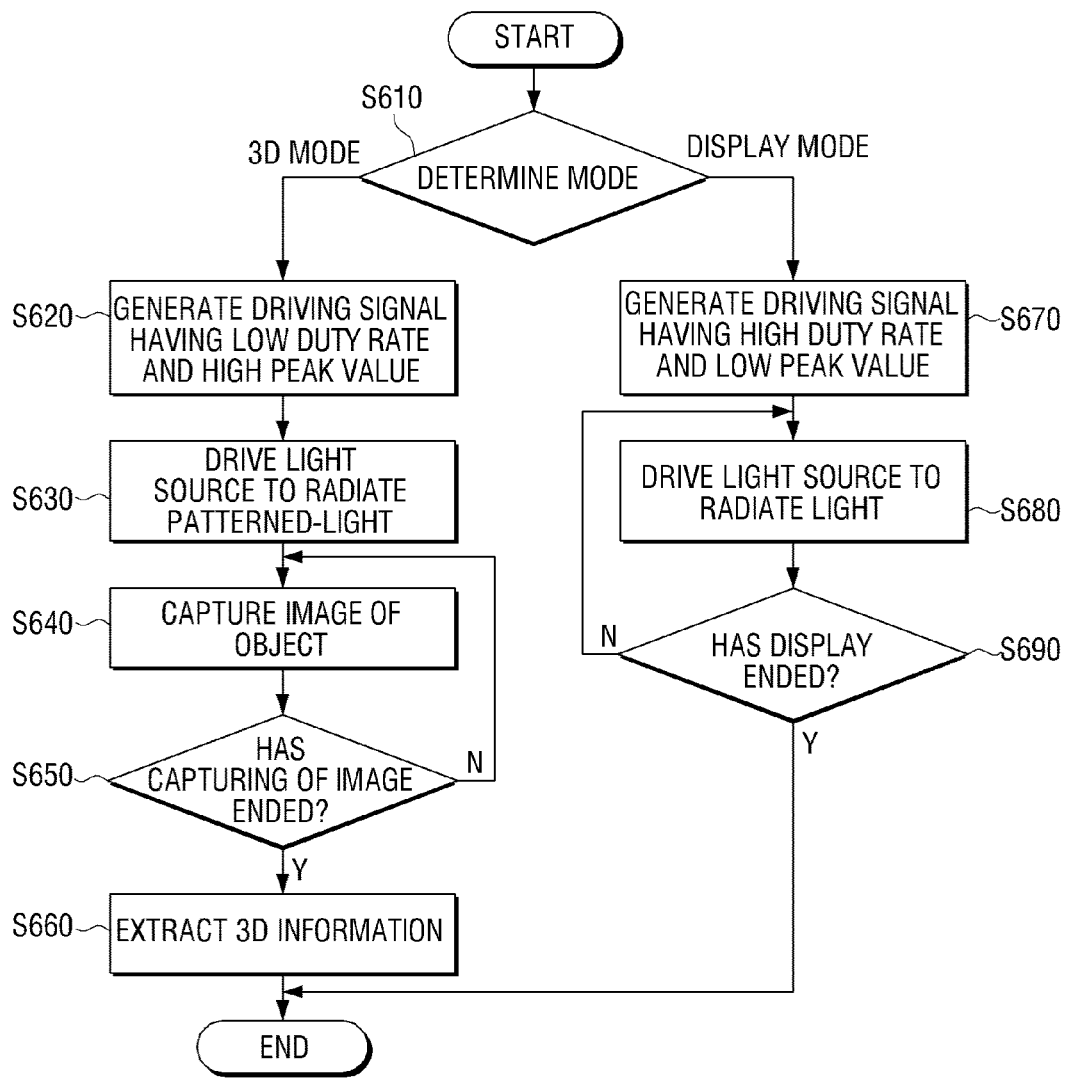
FIG. 6 is a flowchart illustrating a method of acquiring 3D information according to an embodiment of the present invention.

An operation flow of the apparatus 100 will now be described with reference to FIG. 6. FIG. 6 is a flowchart illustrating a method for acquiring 3D information according to an embodiment of the present invention.

The apparatus 100 determines a mode of operation (S610). As described above, the apparatus 100 can operate in at least a display mode and a 3D mode for acquiring 3D information.

If it is determined that the mode of the apparatus 100 is the 3D mode (S610), the apparatus 100 generates a driving signal which has a lower duty rate and a higher peak value than in the display mode (S620). A light source is driven according to the generated driving signal to radiate patterned light onto an object (S630).

The apparatus 100 captures an image of the object onto which the patterned light has been radiated to generate an image (S640). The apparatus 100 determines whether the capturing of the image has ended (S650). If it is determined that the capturing of the image has ended (S650-Y), the apparatus 100 analyzes the generated image to extract 3D information of the object (S660).

If it is determined that the mode of the apparatus 100 is the display mode (S610), the apparatus 100 generates a driving signal which has a higher duty rate and a lower peak value than in the 3D mode (S670). The light source is driven according to the generated driving signal to radiate light (S680). Any particular pattern of light, or, indeed, unpatterned light, may be controlled by controller 110. The radiated light may be applied to a display panel.

The apparatus 100 determines whether a display has ended. If it is determined that the display has ended (S690-Y), the apparatus 100 ends the display mode.

Accordingly, a light amount enough to cope with brightness of ambient light and acquire 3D information can be provided.

4. System for Acquiring 3D Information

Figure 7:
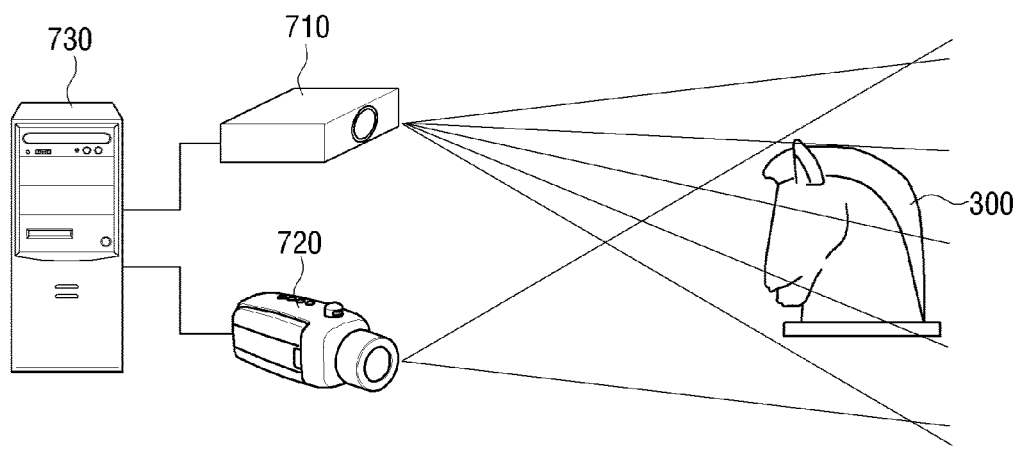
FIG. 7 is a view illustrating a system for acquiring 3D information according to an embodiment of the present invention.

FIG. 7 is a view illustrating a system for acquiring 3D information according to an embodiment of the present invention. As described above, the apparatus 100 may be realized as a device into which the projector 130 and the photographing unit 140 are united. However, as shown in FIG. 7, separate devices may be integrated into a system to be used for acquiring 3D information.

For this purpose, the system includes a projecting apparatus 710, a photographing apparatus 720, and a controlling apparatus 730 and also operates in a display mode and a 3D mode.

Operations and roles of the projecting apparatus 710, the photographing apparatus 720, and the controlling apparatus 730 may be the same as or may be inferred from those of the projector 130, the photographing unit 140, and the controller 110 of the apparatus 100 of FIG. 1, and thus detailed descriptions of them will be omitted.

Accordingly, a light source enough to cope with brightness of ambient light and acquire 3D information can be provided.

While in the foregoing descriptions, embodiment were described with reference to a DSLR camera, the teachings of the described embodiments can be practiced in any SLR camera having a focus detecting device.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. An apparatus for acquiring 3-dimensional (3D) information, comprising:
   a projector configured to project light;
   a photographing unit configured to capture an image of an object onto which the light has been projected; and
   a controller configured to cause a driving signal having a first peak current to be applied to the projector in a display mode and to cause a driving signal having a second peak current higher than the first peak current to be applied to the projector in a 3D information acquisition mode, wherein the 3D acquisition mode is a mode in which the apparatus projects patterned light onto an object and captures the object onto which the patterned light is projected in order to acquire 3D depth information of the object, and wherein the modes are switchable.

2. The apparatus of claim 1, wherein the controller causes a duty rate of the driving signal applied to the projector in the 3D information acquisition mode to be lower than a duty rate of the driving signal applied to the projector in the display mode so that the driving signal has the second peak current higher than the first peak current.

3. The apparatus of claim 2, wherein the second peak current is 5 times or less higher than the first peak current.

4. The apparatus of claim 1, wherein in the 3D information acquisition mode, the projector projects sequentially the plurality of patterned lights onto the object, the photographing unit sequentially captures images of the object onto which the plurality of patterned lights have been projected, to generate a plurality of images, and the controller analyzes the plurality of images to acquire 3D depth information of the object.

5. The apparatus of claim 4, wherein the controller controls the storage unit to separately store each of the plurality of images or add metadata related to the patterned lights to the plurality of images.

6. The apparatus of claim 4, wherein the plurality of patterned lights are formed with darker portions and brighter portions alternately arranged in each of the plurality of patterned lights.

7. The apparatus of claim 1, wherein in the display mode, the projector projects light onto a display panel, and the controller generates an image on the display panel.

8. The apparatus of claim 1, wherein the projector projects the light using a light-emitting diode (LED) or a laser diode (LD) as a light source.

9. The apparatus of claim 1, wherein the apparatus is a mobile display apparatus.

10. A method for driving a light source of an apparatus for acquiring 3D information, comprising:
  determining whether the apparatus is to operate in a display mode or a 3D information acquisition mode;
  if it is determined that the apparatus is to operate in the display mode, applying a driving signal having a first peak current to the light source, and if it is determined that the apparatus is to operate in the 3D information acquisition mode, applying a driving signal having a second peak current higher than the first peak current to the light source; and
  projecting light based on the driving signal,
  wherein the 3D acquisition mode is a mode in which the apparatus projects patterned light onto an object and captures the object onto which the patterned light is projected in order to acquire 3D depth information of the object, and
  wherein the modes are switchable.

11. The method of claim 10, wherein the application of the driving signal comprises reducing a duty rate of the driving signal applied in the 3D information acquisition mode as compared to a duty rate of the driving signal applied in the display mode to apply the driving signal having the second peak current higher than the first peak current.

12. The method of claim 10, wherein the second peak current is 5 times or less higher than the first peak current.

13. The method of claim 10, wherein in the 3D information acquisition mode, the projected light includes a plurality of patterned lights which are sequentially projected, wherein the method further comprises sequentially capturing image of an object onto which the plurality of patterned lights have been sequentially projected to generate a plurality of images and analyzing the plurality of images to acquire 3D depth information.

14. The method of claim 13, further comprising separately storing the plurality of images or adding metadata related to the plurality of patterned lights to the plurality of images.

15. The method of claim 13, wherein the plurality of patterned lights are formed with darker portions and brighter portions alternately arranged in each of the plurality of patterned lights.

16. The method of claim 10, further comprising: if it is determined that the mode of the apparatus is a display mode, generating an image on a display panel,
  wherein the projection of the light comprises projecting the light onto the display panel on which the image has been generated.

17. The method of claim 10, wherein the light source is an LED or an LD.

18. A system for acquiring 3D information, comprising:
  a projecting apparatus having a light source configured to project light; and
  a photographing apparatus configured to capture an image of an object onto which the light has been projected,
  wherein the projecting apparatus applies a driving signal having a first peak current to the light source in a display mode and applies a driving signal having a second peak current higher than the first peak current to the light source in a 3D information acquisition mode,
  wherein the 3D acquisition mode is a mode in which the apparatus projects patterned light onto an object and captures the object onto which the patterned light is projected in order to acquire 3D depth information of the object, and
  wherein the modes are switchable.

19. The apparatus of claim 6, wherein the number and an arrangement of the brighter portions and the darker portions in each of the plurality of patterned lights are at least one of:
  different from each other,
  in forms which have consecutively varying light intensity distributions, and/or
  in forms in which patterns having different types of color information are combined with one another.

20. The method of claim 15, wherein the number and an arrangement of the brighter portions and the darker portions in each of the plurality of patterned lights are at least one of:
  different from each other,
  in forms which have consecutively varying light intensity distributions, and/or
  in forms in which patterns having different types of color information are combined with one another.

21. A mobile terminal comprising:
  one or more light sources for projecting light,
  wherein at least one of the one or more light sources has a first mode in which it is driven by a first peak current and a first duty rate and a second mode in which it is driven by a second peak current higher than the first peak current and a second duty cycle lower than the first duty cycle,
  wherein the second mode may be used for acquiring information for at least one 3D image, and
  wherein the modes are switchable.

* * * * *